United States Patent
Ryu et al.

(10) Patent No.: US 8,026,006 B2
(45) Date of Patent: Sep. 27, 2011

(54) ORGANIC ELECTROLYTE SOLUTION INCLUDING ELECTROGRAFTING MONOMER AND LITHIUM BATTERY USING THE SAME

(75) Inventors: Young-gyoon Ryu, Yongin-si (KR); Sang-kook Mah, Yongin-si (KR); Jae-young Choi, Yongin-si (KR); Seok-soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1218 days.

(21) Appl. No.: 11/690,030

(22) Filed: Mar. 22, 2007

(65) Prior Publication Data

US 2008/0044734 A1 Feb. 21, 2008

(30) Foreign Application Priority Data

Aug. 21, 2006 (KR) .................. 10-2006-0078915

(51) Int. Cl.
*H01M 6/18* (2006.01)
(52) U.S. Cl. ........ 429/306; 429/303; 429/304; 429/300; 429/332; 429/333; 429/341; 252/62.2
(58) Field of Classification Search .................. 429/306, 429/303, 304, 300, 332, 333, 341; 252/62.2
See application file for complete search history.

(56) References Cited

U.S. PATENT DOCUMENTS

| | | | | |
|---|---|---|---|---|
| 6,248,479 B1 * | 6/2001 | Takeda et al. | ............... | 429/300 |
| 7,087,349 B2 * | 8/2006 | Kim et al. | ............... | 429/332 |
| 7,094,501 B2 * | 8/2006 | Blau et al. | ............... | 429/306 |
| 7,288,339 B2 | 10/2007 | Cho et al. | | |
| 7,691,537 B2 * | 4/2010 | Kim | ............... | 429/333 |

FOREIGN PATENT DOCUMENTS

| | | |
|---|---|---|
| CN | 1341977 | 3/2002 |
| CN | 1416191 A | 5/2003 |
| JP | 11-007980 | 1/1999 |
| JP | 2000-348767 | 12/2000 |
| JP | 2004-342318 | 12/2004 |
| JP | 2005-008802 | 1/2005 |
| KR | 10-1999-0047614 | 7/1999 |
| KR | 10-2002-0008581 | 1/2002 |
| KR | 2003-0089750 | 11/2003 |

OTHER PUBLICATIONS

Chinese Office action dated Oct. 10, 2008, for corresponding Chinese application 2007100057809, with English translation indicating relevance of listed reference in this IDS.
Megahed, et al., *Lithium-ion rechargeable batteries*; Journal of Power Sources, 51 (1994) pp. 79-104.
(Abstract only) Naoi et al., *Modification of the lithium metal surface by nonionic polyether surfactants. II. Investigations with Microelectrode Voltammetry and In Situ Quartz Crystal Microbalance,* Journal of Electromechanical Society, vol. 147, No. 3, Mar. 2000, pp. 813-819 "On Order".
SIPO Certificate of Patent dated Jul. 14, 2010, for corresponding Chinese Patent application200710005780.9, noting listed references in this IDS, as well as CN 1416191, previously filed in an IDS dated Jan. 30, 2009.
Naoi et al., *Modification of the lithium metal surface by nonionic polyether surfactants. II. Investigations with Microelectrode Voltammetry and In Situ Quartz Crystal Microbalance*, Journal of Electromechanical Society, vol. 147, No. 3, Mar. 2000, pp. 813-819.
English machine translation of Japanese Publication 2005-008802 listed above, 2005.
Korean Patent Abstract for Korean Patent 10-0236843, corresponding to Korean Publication 10-1999-0047614 listed above, 1999.
Korean Registration Determination Certificate dated May 9, 2008, for Korean priority Patent application 10-2006-0078915, noting listed references in this IDS.

* cited by examiner

*Primary Examiner* — Laura Weiner
(74) *Attorney, Agent, or Firm* — Christie, Parker & Hale, LLP

(57) ABSTRACT

An organic electrolyte solution and a lithium battery using the same are provided. The organic electrolyte solution uses a monomer compound which can be electrografted, and which prevents crack formation caused by volumetric changes in the anode active material during battery charging/discharging. This improves charge/discharge characteristics, thereby improving the stability, reliability, and charge/discharge efficiency of the battery.

8 Claims, 4 Drawing Sheets

ORGANIC ELECTROLYTE SOLUTION INCLUDING ELECTROGRAFTING MONOMER AND LITHIUM BATTERY USING THE SAME

CROSS-REFERENCE TO RELATED PATENT APPLICATION

This application claims priority and the benefit of Korean Patent Application No. 10-2006-0078915, filed on Aug. 21, 2006 in the Korean Intellectual Property Office, the entire content of which is incorporated herein by reference.

BACKGROUND OF THE INVENTION

1. Field of the Invention

The present invention relates to lithium batteries. More particularly, the present invention relates to organic electrolyte solutions using monomer compounds which can be electrografted.

2. Description of the Related Art

As portable electronic devices, such as video cameras, cellular phones, and notebook PCs, become lighter and have higher performance, much research into batteries as driving power sources for the devices has been conducted. In particular, re-chargeable (secondary) lithium batteries have been actively studied because they have energy densities (per unit weight) three times greater than those of conventional lead storage batteries, nickel-cadmium batteries, nickel hydrogen batteries, nickel zinc batteries, etc. In addition, lithium secondary batteries can be rapidly re-charged.

Conventional lithium batteries are operated at high operating voltages, and thus, conventional aqueous electrolyte solutions cannot be used due to the vigorous reaction of the aqueous solution with the lithium used as the anode. In this regard, organic electrolyte solutions obtained by dissolving lithium salts in organic solvents are generally used in lithium batteries. In particular, organic solvents having high ion conductivity, high dielectric constants, and low viscosities have been used. However, it is difficult to obtain a single organic solvent having all of these properties, and thus, mixed solvents have been proposed, for example an organic solvent including a solvent with a high dielectric constant and another organic solvent with low viscosity.

When a carbonate-based, non-aqueous polar solvent is used in a lithium secondary battery, excess charge occurs due to a reaction between the carbon of the anode and the electrolyte solution during initial charging. Such an irreversible reaction forms a passivation layer, such as a solid electrolyte interface (SEI) film, on the surface of the anode. The SEI film prevents further decomposition of the electrolyte solution and maintains stable charging/discharging. The SEI film also serves as an ion tunnel through which only lithium ions pass. In general, organic solvents solvate lithium ions, and are cointercalated with lithium ions into a carbon anode during battery charging/discharging. However, SEI films allow only lithium ions to pass, thereby preventing the cointercalation of organic solvents with lithium ions into the carbon anode. This prevents degradation of the anode structure caused by the cointercalation of solvents and lithium ions during battery charging/discharging.

However, the SEI film gradually cracks and delaminates from the surface of the electrode due to volumetric expansion and shrinkage of the active material during repeated charging/discharging. As a result, the electrolyte directly contacts the active material, causing continuous decomposition of the electrolyte. Once the SEI film cracks, the crack continuously extends during charging/discharging, thereby degrading the active material. In particular, when the active material contains a metal, such as silicon, active material degradation worsens due to large volumetric changes during charge/discharge cycles. Furthermore, repeated volumetric shrinkage and expansion of the active material causes agglomeration of silicon particles.

SUMMARY OF THE INVENTION

In one embodiment of the present invention, an organic electrolyte solution uses a monomer compound which can be electrografted. According to one embodiment, the organic electrolyte solution prevents direct contact between the metal active material and the electrolyte. According to another embodiment, the organic electrolyte solution prevents reductions in the conduction characteristics of lithium ions.

In another embodiment of the present invention, a lithium battery uses the organic electrolyte solution. According to one embodiment, the lithium battery has improved charge/discharge characteristics.

According to one embodiment of the present invention, an organic electrolyte solution includes a lithium salt, an organic solvent including a high dielectric constant solvent and a low boiling point solvent, and a monomer compound represented by Formula 1 below.

Formula 1:

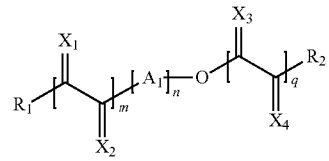

In Formula 1, n is a real number ranging from 1 to 20, m is an integer ranging from 0 to 10, and q is an integer ranging from 1 to 10. Each of $X_1$, $X_2$, $X_3$, and $X_4$ is independently selected from O, $CH_2$, and NH. Each of $R_1$ and $R_2$ is independently selected from hydrogen, halogens, unsubstituted $C_{1-20}$ alkoxy groups, halogen substituted $C_{1-20}$ alkoxy groups, unsubstituted $C_{1-20}$ alkyl groups, halogen substituted $C_{1-20}$ alkyl groups, unsubstituted $C_{6-30}$ aryl groups, halogen substituted $C_{6-30}$ aryl groups, unsubstituted $C_{2-30}$ heteroaryl groups and halogen substituted $C_{2-30}$ heteroaryl groups. $A_1$ is at least one polar repeating unit selected from oxyalkylene groups, carbonyl groups, and

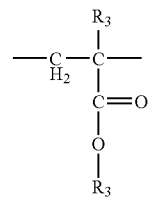

groups, where $R_3$ is selected from hydrogen, unsubstituted $C_{1-20}$ alkyl groups and halogen substituted $C_{1-20}$ alkyl groups.

According to one embodiment of the present invention, in the organic electrolyte solution, the monomer compound of Formula 1 may be a compound selected from compounds represented by Formulae 2 and 3 below, and combinations thereof.

Formula 2:

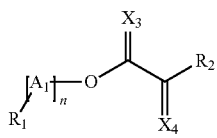

Formula 3:

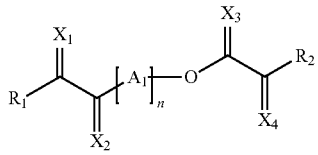

In Formulae 2 and 3, $A_1$, $R_1$, $R_2$, $X_1$, $X_2$, $X_3$, $X_4$, and n are as defined above with respect to Formula 1.

According to another embodiment of the present invention, in the organic electrolyte solution, the monomer compound of Formula 1 above may be a compound selected from compounds represented by Formulae 4 and 5 below, and combinations thereof.

Formula 4:

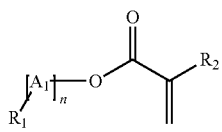

Formula 5:

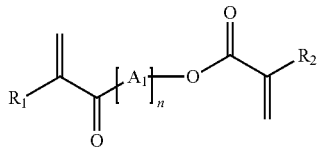

In Formula 4 and 5, $A_1$, $R_1$ and $R_2$ are as defined above with respect to Formula 1.

According to yet another embodiment of the present invention, in the organic electrolyte solution, $A_1$ may be an oxyalkylene group selected from oxyethylene groups, oxypropylene groups, oxybutylene groups, oxypentylene groups and combinations thereof.

According to still another embodiment of the present invention, in the organic electrolyte solution, the monomer compound of Formula 1 may be a compound selected from compounds represented by Formulae 6 through 9 below and combinations thereof.

Formula 6:

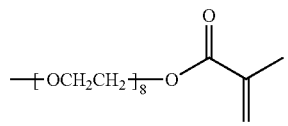

Formula 7:

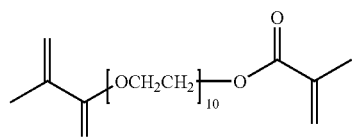

Formula 8:

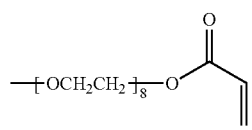

Formula 9:

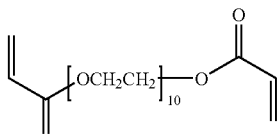

According to one embodiment of the present invention, the monomer compound is present in the organic electrolyte solution in an amount ranging from about 0.5 to about 20 wt % based on the total weight of the organic solvent.

According to another embodiment of the present invention, the monomer compound is present in the organic electrolyte solution in an amount ranging from about 1 to about 15 wt % based on the total weight of the organic solvent.

According to yet another embodiment of the present invention, the concentration of the lithium salt in the organic electrolyte solution ranges from about 0.5 to about 2.0M.

According to still another embodiment of the present invention, in the organic electrolyte solution, the high dielectric constant solvent may be selected from ethylene carbonate, propylene carbonate, butylene carbonate, gamma butyrolactone and combinations thereof.

According to another embodiment of the present invention, in the organic electrolyte solution, the low boiling point solvent may be selected from dimethyl carbonate, ethylmethyl carbonate, diethyl carbonate, dipropyl carbonate, dimethoxyethane, diethoxyethane, fatty acid ester derivatives and combinations thereof.

According to one embodiment of the present invention, in the organic electrolyte solution, the lithium salt may be $LiPF_6$, the high dielectric constant solvent may be ethylene carbonate, the low boiling point solvent may be diethyl carbonate, and the monomer compound may be poly(ethyleneglycol)methyl ether methacrylate (n=8) or poly(ethyleneglycol)dimethacrylate (n=10).

According to another embodiment of the present invention, a lithium battery includes a cathode, an anode, and the organic electrolyte solution.

BRIEF DESCRIPTION OF THE DRAWINGS

The above and other features and advantages of the present invention will be better understood by reference to the following detailed description when considered in conjunction with the attached drawings in which.

DETAILED DESCRIPTION OF THE INVENTION

Figure 1:
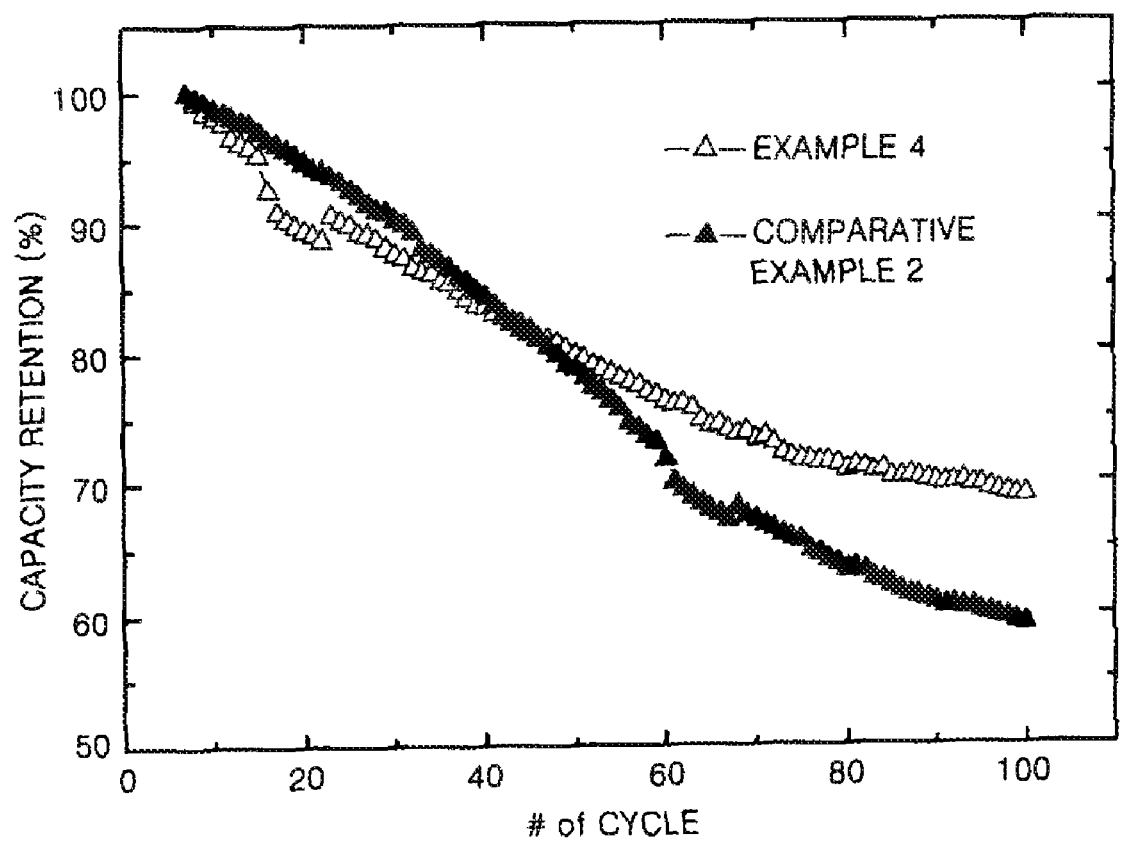
FIG. 1 is a graph of the capacity retention ratios of the lithium ion batteries prepared according to Example 4 and Comparative Example 2.

According to one embodiment of the present invention, an organic electrolyte solution includes a monomer compound which can be electrografted. In another embodiment, a lithium battery uses the organic electrolyte solution. In one embodiment of the present invention, the organic electrolyte solution prevents crack formation caused by volumetric changes in the anode active material during battery charging/discharging. This improves charge/discharge characteristics, which in turn improves the stability, reliability, and charge/discharge efficiency of the battery.

In one embodiment of the present invention, the electrolyte solution includes a monomer compound having an end including a functional group having a double bond and another end including a polar repeating unit. Alternatively, both ends of the monomer compound have functional groups having double bonds and both ends have a polar repeating unit.

In one exemplary embodiment, the organic electrolyte solution includes a lithium salt, an organic solvent including a high dielectric constant solvent and a low boiling point solvent, and a monomer compound represented by Formula 1 below.

Formula 1:

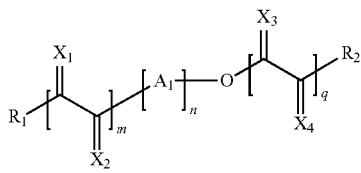

In Formula 1, n is a real number ranging from 1 to 20, m is an integer ranging from 0 to 10, and q is an integer ranging from 1 to 10. Each of $X_1$, $X_2$, $X_3$, and $X_4$ is independently selected from O, $CH_2$, and NH. Each of $R_1$ and $R_2$ is independently selected from hydrogen, halogens, unsubstituted $C_{1-20}$ alkoxy groups, halogen substituted $C_{1-20}$ alkoxy groups, unsubstituted $C_{1-20}$ alkyl groups, halogen substituted $C_{1-20}$ alkyl groups, unsubstituted $C_{6-30}$ aryl groups, halogen substituted $C_{6-30}$ aryl groups, unsubstituted $C_{2-30}$ heteroaryl groups and halogen substituted $C_{2-30}$ heteroaryl groups. $A_1$ is at least one polar repeating unit selected from oxyalkylene groups, carbonyl groups, and

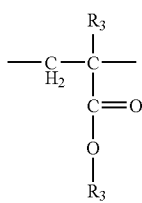

groups, where $R_3$ is selected from hydrogen, unsubstituted $C_{1-20}$ alkyl groups and halogen substituted $C_{1-20}$ alkyl groups.

In another embodiment, the monomer compound of Formula 1 may be selected from compounds represented by Formula 2 and 3 below and combinations thereof.

Formula 2:

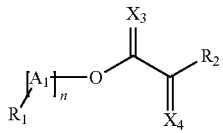

<Formula 3>

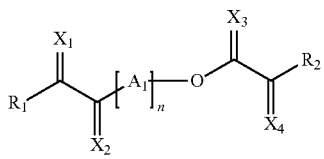

In Formulae 2 and 3, $A_1$, $R_1$, $R_2$, $X_1$, $X_2$, $X_3$, $X_4$, and n are as defined above with respect to Formula 1.

In yet another embodiment, the monomer compound of Formula 1 above is selected from compounds represented by Formula 4 and 5 below and combinations thereof.

Formula 4:

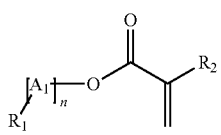

Formula 5:

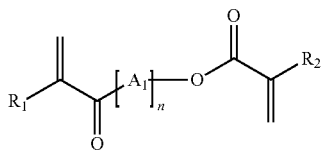

In Formulae 4 and 5, $A_1$, $R_1$ and $R_2$ are as defined above with respect to Formula 1.

According to one embodiment, in the monomer compounds of Formulae 1 through 5, $A_1$ may be selected from oxyethylene groups, oxypropylene groups, oxybutylene groups, oxypentylene groups, and the like.

In one embodiment, the monomer compound of Formula 1 is a compound selected from compounds represented by Formulae 6 through 9 below.

Formula 6:

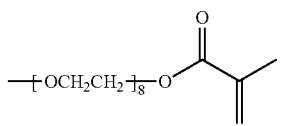

Formula 7:

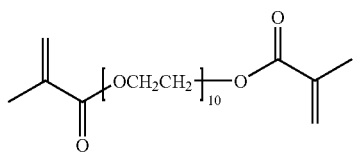

Formula 8:

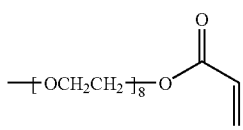

Formula 9:

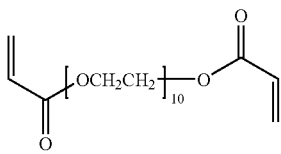

Functions of the monomer compound in the organic electrolyte solution will now be described. However, these functions are exemplary only and are not intended to limit the scope of the invention.

The monomer compound which can be electrografted is covalently bound to a surface of the active material when a double bond on an end of the monomer compound is reduced with electrons donated from the surface of the active material. Such a covalent bond is a kind of chemical adsorption. Through the chemical adsorption, the monomer compound can form a monolayer on the surface of the active material. The monomer compound monolayer can prevent direct contact between the active material and the electrolyte. That is, the monomer compound monolayer can prevent crack formation caused by volumetric changes in the anode active material during lithium intercalation/deintercalation.

The monomer compound monolayer can again react with another monomer compound to thereby form a thick layer structure including two or more molecular layers on the surface of the active material.

The polar repeating unit of the monomer compound has an affinity with a polar solvent, thereby facilitating diffusion of the electrolyte and lithium ions in the electrolyte solution, together with the solvent, into the monomer compound monolayer. As such, although the monolayer (a kind of a passivation layer) made of the monomer compound is present on the surface of the active material, the charge/discharge rate of lithium is not significantly affected due to the easy diffusion of lithium ions into the monolayer.

In one embodiment of the present invention, the monomer compound may be present in the organic electrolyte solution in an amount ranging from about 0.5 to about 20 wt % based on the total weight of the organic solvent. In another embodiment, the monomer compound is present in an amount ranging from about 1 to about 15 wt %, based on the total weight of the organic solvent. If the monomer compound is present in an amount exceeding about 20 wt %, the charge/discharge characteristics of the battery may be degraded due to a shortage of effective material influencing the performance of the battery. On the other hand, if the monomer compound is present in an amount less than about 0.5 wt %, it may be difficult to sufficiently achieve the desired effect.

The high dielectric constant solvent used in the organic electrolyte solution is not particularly limited and can be any such solvent commonly used in the art. Nonlimiting examples of suitable high dielectric constant solvents include cyclic carbonates (e.g., ethylene carbonate, propylene carbonate, and butylene carbonate), gamma-butyrolactone, and the like.

Similarly, the low boiling point solvent used in the organic electrolyte solution is also not limited and may be any such solvent commonly used in the art. Nonlimiting examples of suitable low boiling point solvents include chain carbonates (e.g., dimethyl carbonate, ethylmethyl carbonate, diethyl carbonate, and dipropyl carbonate), dimethoxyethane, diethoxyethane, fatty acid ester derivatives, and the like.

In one embodiment, the high dielectric constant solvent and the low boiling point solvent may be mixed in a ratio ranging from about 1:1 to about 1:9 by volume. If the mixture ratio of the high dielectric constant solvent and the low boiling point solvent is outside this range, discharge capacity and charge/discharge cycle life may be reduced.

The lithium salt is not limited and may be any lithium salt commonly used in lithium batteries. Nonlimiting examples of suitable lithium slats include $LiClO_4$, $LiCF_3SO_3$, $LiPF_6$, $LiN(CF_3SO_2)_2$, $LiBF_4$, $LiC(CF_3SO_2)_3$, and $LiN(C_2F_5SO_2)_2$.

In one embodiment, the concentration of the lithium salt in the organic electrolyte solution ranges from about 0.5 to about 2M. If the concentration of the lithium salt is lower than about 0.5M, the conductivity of the organic electrolyte solution may be reduced, thereby degrading the performance of the organic electrolyte solution. On the other hand, if the concentration exceeds about 2.0M, the viscosity of the organic electrolyte solution may increase, thereby decreasing the mobility of lithium ions.

In one exemplary embodiment, the organic electrolyte solution includes $LiPF_6$ as the lithium salt, ethylene carbonate as the high dielectric constant solvent, diethyl carbonate as the low boiling point solvent, and poly(ethyleneglycol)methyl ether methacrylate (n=8) or poly(ethyleneglycol) dimethacrylate (n=10) as the monomer compound.

According to one embodiment of the present invention, the $C_{1-20}$ alkoxy group used in the monomer compound includes a straight or branched radical. In one embodiment, for example, the monomer compound includes a straight or branched radical having from 1-12 carbon atoms. In another embodiment, the alkoxy group is a lower alkoxy radical having from 1-6 carbon atoms. Nonlimiting examples of suitable alkoxy radicals include methoxy radicals, ethoxy radicals, n-propoxy radicals, isopropoxy radicals, n-butoxy radicals, isobutoxy radicals, sec-butoxy radicals, t-butoxy radicals, pentoxy radicals, and hexoxy radicals. In yet another embodiment, the alkoxy groups is a lower alkoxy radical having from 1-3 carbon atoms.

In one embodiment of the present invention, the $C_{1-20}$ alkyl group used in the monomer compound includes a straight or branched radical. In one exemplary embodiment, for example, the alkyl group is a straight or branched radical having from 1-12 carbon atoms. In another embodiment, the alkyl radical is a lower alkyl radical having from 1-6 carbon atoms. Nonlimiting examples of suitable alkyl radicals include methyl radicals, ethyl radicals, n-propyl radicals, isopropyl radicals, n-butyl radicals, isobutyl radicals, sec-butyl radicals, t-butyl radicals, pentyl radicals, iso-amyl radicals, and hexyl radicals. In yet another embodiment, the alkyl radical is a lower alkyl radical having from 1-3 carbon atoms.

According to one embodiment of the present invention, the $C_{6-30}$ aryl group used in the monomer compound comprises a single aryl group or a combination of aryl groups. The aryl group includes a carbocyclic aromatic system of from 6-30 carbon atoms containing one or more rings. The rings may be attached to each other as a pendant group or may be fused. The term "aryl," as used herein, means an aromatic radical, nonlimiting examples of which include phenyl radicals, naphthyl radicals, tetrahydronaphthyl radicals, indenyl radicals, and biphenyl radicals. In one exemplary embodiment, the aryl group is a phenyl group. In another embodiment, the aryl group may have from 1-3 substituent groups selected from hydroxy groups, halo groups, haloalkyl groups, nitro groups, cyano groups, alkoxy groups, and lower alkylamino groups.

In one embodiment, the $C_{2-30}$ heteroaryl group used in the monomer compound includes a 5-30 member, monovalent, monocyclic or bicyclic aromatic radical containing from 1-3 hetero atoms selected from N, O, P, and S. The term "heteroaryl," as used herein, includes monovalent, monocyclic or bicyclic aromatic radicals in which a heteroatom in a ring is oxidized or quaternized to form, for example, a N-oxide or a quaternary salt. Nonlimiting examples of suitable heteroaryl groups include thienyl groups, benzothienyl groups, pyridyl groups, pyrazinyl groups, pyrimidinyl groups, pyridazinyl groups, quinolinyl groups, quinoxalinyl groups, imidazolyl groups, furanyl groups, benzofuranyl groups, thiazolyl groups, isoxazolyl groups, benzisoxazolyl groups, benzimidazolyl groups, triazolyl groups, pyrazolyl groups, pyrrolyl groups, indolyl groups, 2-pyridonyl groups, 4-pyridonyl groups, N-alkyl-2-pyridonyl groups, pyrazinonyl groups, pyridazinonyl groups, pyrimidinonyl groups, oxazolonyl groups, N-oxides thereof (e.g., pyridyl N-oxide, quinolinyl N-oxide), and quaternary salts thereof.

Figure 4:
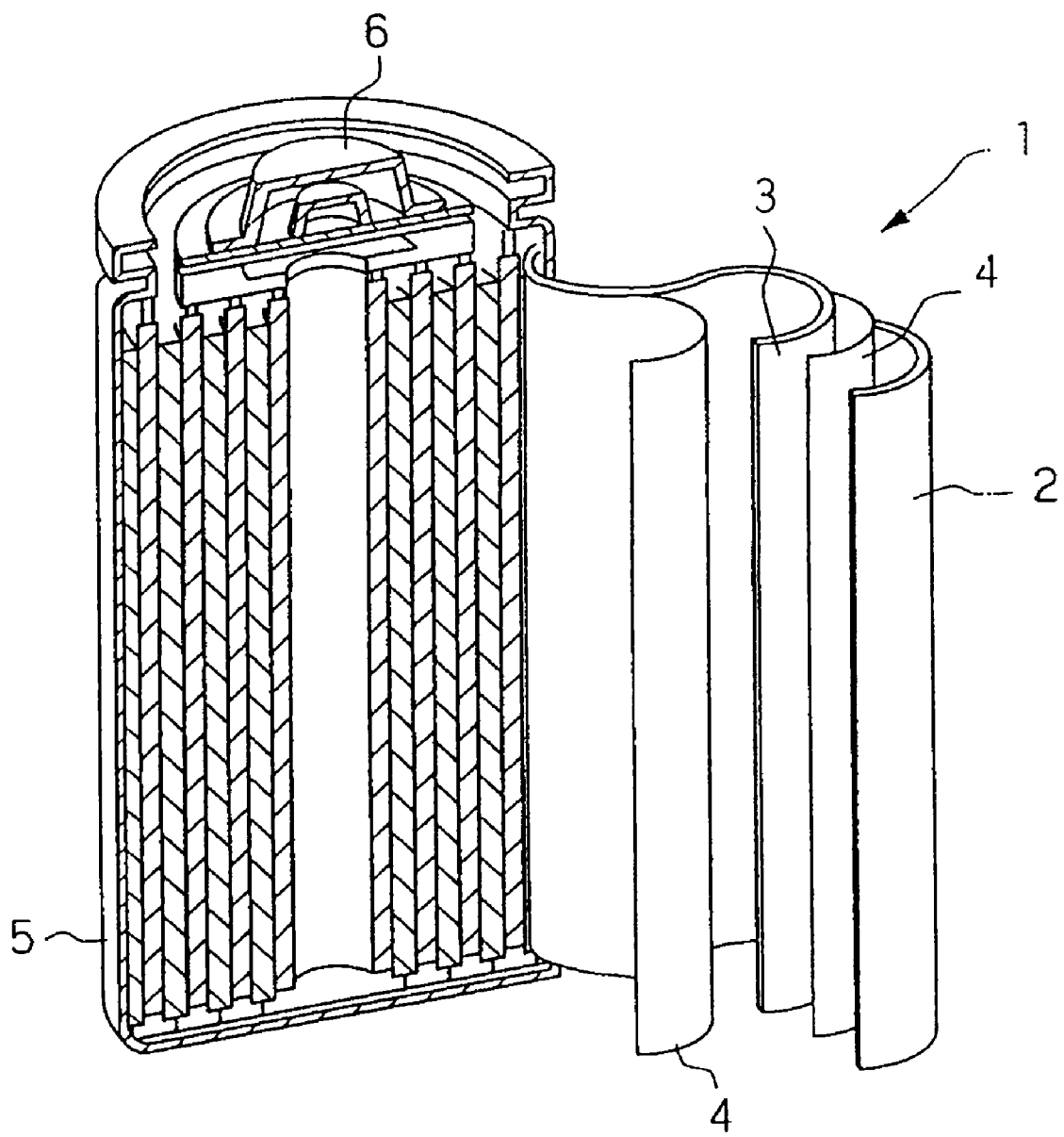
FIG. 4 is a schematic perspective view of a lithium battery according to one embodiment of the present invention.

According to another embodiment of the present invention, as shown in FIG. 4, a lithium battery 1 comprises an electrode assembly including a cathode 2, an anode 3 and a separator 4 positioned between the cathode 2 and anode 3. The electrode assembly is wound and placed in a battery case 5 which is sealed with a cap assembly 6. An organic electrolyte solution according to one embodiment of the present invention is injected into the battery case 5 to complete the lithium battery. The shape of the lithium battery is not particularly limited. Furthermore, the lithium battery may be a lithium primary battery as well as a lithium secondary battery. For example, the lithium battery may be a lithium ion battery, a lithium ion polymer battery, or a lithium sulfur battery.

According to one embodiment of the present invention, the lithium battery can be manufactured as follows.

First, a cathode active material, a conducting agent, a binder, and a solvent are mixed to prepare a cathode active material composition. The cathode active material composition is directly coated on an aluminum current collector and dried to prepare a cathode plate. Alternatively, the cathode active material composition is cast on a separate support and dried to form film which is then separated from the support and laminating on an aluminum current collector to prepare a cathode plate.

The cathode active material is not limited and may be any lithium-containing metal oxide commonly used in the art. Nonlimiting examples of suitable cathode active materials include $LiCoO_2$, $LiMn_xO_{2x}$, $LiNi_{x-1}Mn_xO_{2x}$ (where x is 1 or 2), $Ni_{1-x-y}Co_xMn_yO_2$ ($0 \leq x \leq 0.5$, $0 \leq y \leq 0.5$), and the like.

One nonlimiting example of a suitable conducting agent is carbon black.

Nonlimiting examples of suitable binders include vinylidene fluoride/hexafluoropropylene copolymers, polyvinylidenefluoride (PVdF), polyacrylonitrile, polymethylmethacrylate, polytetrafluoroethylene, and mixtures thereof. Other nonlimiting examples of suitable binders include styrene butadiene rubber-based polymers.

Nonlimiting examples of suitable solvents include N-methylpyrrolidone (NMP), acetone, water, and the like. The cathode active material, the conducting agent, the binder, and the solvent are each used in an amount commonly used in lithium batteries.

Similarly, an anode active material, a conducting agent, a binder, and a solvent are mixed to prepare an anode active material composition. The anode active material composition is directly coated on a copper current collector to form an anode plate. Alternatively, the anode active material composition is cast on a separate support and dried to form a film which is then separated from the support and laminated on a copper current collector to obtain an anode plate. The anode active material, the conducting agent, the binder, and the solvent are each used in an amount commonly used in lithium batteries.

The anode active material may selected from silicon metal, silicon thin films, lithium metal, lithium alloys, carbonaceous materials, graphite, and mixtures thereof. The conducting agent, the binder, and the solvent in the anode active material composition are the same as those in the cathode active material composition. In some embodiments, the cathode active material composition and the anode active material composition may further include a plasticizer to form pores inside the electrode plates.

Any separator commonly used in lithium batteries may be used. For example, a separator having low resistance against ion mobility of the electrolyte and good impregnation with the electrolyte solution may be used. Nonlimiting examples of suitable separators include woven or nonwoven fabrics of glass fibers, polyester, Teflon, polyethylene, polypropylene, polytetrafluoroethylene (PTFE), and combinations thereof. In one embodiment, a windable separator made of a material such as polyethylene or polypropylene may be used in lithium ion batteries, and a separator having good impregnation with the organic electrolyte solution may be used in lithium ion polymer batteries.

According to one embodiment, the separator can be manufactured as follows. A polymer resin, a filler, and a solvent are mixed to prepare a separator composition. The separator composition is directly coated on an electrode and dried to form a separator film. Alternatively, the separator composition is cast on a support and dried to form a film which is then separated from the support and laminated on an electrode.

The polymer resin is not particularly limited, and may be selected from any binder materials used in electrode plates. Nonlimiting examples of suitable polymer resins include vinylidenefluoride/hexafluoropropylene copolymers, polyvinylidenefluoride (PVdF), polyacrylonitrile, polymethylmethacrylate, and mixtures thereof. In one embodiment, the polymer resin comprises a vinylidenefluoride/hexafluoropropylene copolymer containing from about 8 to about 25 wt % of hexafluoropropylene.

The separator is disposed between the cathode plate and the anode plate to form a battery structure. The battery structure is wound or folded and encased in a cylindrical or square battery case, and an organic electrolyte solution according to an embodiment of the present invention is then injected into the case to complete a lithium ion battery.

Alternatively, battery structures are stacked to form a bicell structure and impregnated with an organic electrolyte solution according to an embodiment of the present invention. The resultant structure is received in a pouch and sealed to complete a lithium ion polymer battery.

The present invention will now be described with reference to the following examples. However, these examples are provided for illustrative purposes only and are not intended to limit the scope of the invention.

Preparation Example 1

Preparation of Monomer Compound

A monomer compound as represented by Formula 6 above (commercially available from Aldrich (Aldrich Cat. No. 447943, CAS No. 26915-72-0)) was used.

Preparation Example 2

Preparation of Monomer Compound

A monomer compound as represented by Formula 7 above (commercially available from Aldrich (Aldrich Cat. No. 437468, CAS No. 25852-47-5)) was used.

Example 1

Preparation of Electrolyte Solution

An organic electrolyte solution was prepared by adding 5 wt % of poly(ethyleneglycol)methyl ether methacrylate (n=8) of Formula 6 below as an additive to a mixed organic solvent composed of 30 vol % of ethylene carbonate and 70 vol % of diethyl carbonate and using 1M $LiN(C_2F_5SO_2)_2$ (BETI) as a lithium salt.

Formula 6:

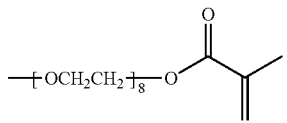

Example 2

Preparation of Electrolyte Solution

An organic electrolyte solution was prepared as in Example 1 except that 5 wt % of poly(ethyleneglycol)dimethacrylate (n=10) of Formula 7 below was used instead of 5 wt % of the poly(ethyleneglycol)methyl ether methacrylate (n=8) of Formula 6.

Formula 7:

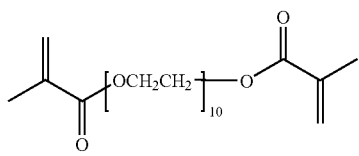

Example 3

Preparation of Electrolyte Solution

An organic electrolyte solution was prepared as in Example 1 except that 2 wt % of poly(ethyleneglycol)methyl ether methacrylate (n=8) of Formula 6 above and 2 wt % of poly(ethyleneglycol)dimethacrylate (n=10) of Formula 7 above were used instead of 5 wt % of the poly(ethyleneglycol) methyl ether methacrylate (n=8) of Formula 6.

Comparative Example 1

Preparation of Electrolyte Solution

An organic electrolyte solution was prepared using a mixed organic solvent composed of 30 vol % of ethylene carbonate and 70 vol % of diethyl carbonate and 1M $LiN(C_2F_5SO_2)_2$ (BETI) as a lithium salt in the absence of an additive.

Example 4

Manufacture of Lithium Ion Battery 6 wt % of silicon powder having an average particle size of 0.1 µm and 90 wt % of graphite powder as anode active materials, 4 wt % of PVdF as a binder, and 100 ml of NMP were well mixed and a ceramic ball was added to the mixture. The reaction components were thoroughly stirred for about 10 hours and the resultant mixture was cast on copper foil having a thickness of 19 µm using a doctor blade with a 300 µm gap to obtain an anode. The anode was placed in a 90° C. oven and dried for about 10 hours to evaporate the NMP. Then, the anode was roll-pressed to complete an anode having a thickness of 120 µm.

95 wt % of lithium cobalt oxide ($LiCoO_2$) powder having an average particle size of 20 µm and 3 wt % of amorphous carbon powder as cathode active materials, 2 wt % of PVdF as a binder, and 100 ml of NMP were thoroughly mixed. The resultant mixture was cast on aluminum foil having a thickness of 15 µm using a doctor blade with a 300 µm gap to obtain a cathode. The cathode was placed in a 120° C. oven and dried for about 10 hours to evaporate the NMP. Then, the cathode was roll-pressed to complete a cathode having a thickness of 120 µm.

A 2016 coin cell was manufactured using the cathode having a diameter of 1 cm, the anode having a diameter of 1.2 cm, a polyethylene separator, and the organic electrolyte solution prepared according to Example 1.

Example 5

Manufacture of Lithium Ion Battery

A 2016 coin cell was manufactured as in Example 4, except that the organic electrolyte solution prepared according to Example 2 was used.

Example 6

Manufacture of Lithium Ion Battery

A 2016 coin cell was manufactured as in Example 4, except that the organic electrolyte solution prepared according to Example 3 was used.

Comparative Example 2

Manufacture of Lithium Ion Battery

A coin cell was manufactured as in Example 4 except that the organic electrolyte solution prepared according to Comparative Example 1 was used.

Experimental Example 1

Charge/Discharge Characteristics Test of Batteries

Prior to performing charge/discharge characteristics tests for the coin cells manufactured in Examples 4-6 and Comparative Example 2, the coin cells were sufficiently activating as follows. A constant-current charge was performed using 36 mA of current per 1 g of anode active material until the cell voltage reached 4.2 V. Then, the cells were charged at a constant voltage of 4.2V until the current was reduced to 9 mA per 1 g of the anode active material. Then, a constant-current discharge was performed using 36 mA of current per 1 g of the anode active material until the voltage reached 3.0V. Charge and discharge were repeated six times.

Cycle life tests for the sufficiently activated coin cells were performed under the following conditions. First, a constant-current charge was performed using 90 mA of current per 1 g of the anode active material until the cell voltage reached 4.2 V, and then, the cells were charged at a constant voltage of 4.2V until the current was reduced to 9 mA per 1 g of the anode active material. Then, a constant-current discharge was performed using 90 mA of current per 1 g of the anode active material until the voltage reached 3.0V to thereby obtain charge/discharge capacities. Charge/discharge efficiencies and capacity retention ratios were calculated using the charge and discharge capacities. The charge/discharge efficiencies were calculated using Equation 1 below, and the capacity retention ratios were calculated using Equation 2 below.

Charge/discharge efficiency (%)=discharge capacity/charge capacity   Equation 1

Capacity retention ratio (%)=discharge capacity at $100^{th}$ cycle/discharge capacity at $7^{th}$ cycle   Equation 2

The charge/discharge capacities, charge/discharge efficiencies, and capacity retention ratios were measured according to the number of cycles. The experimental results are summarized in Table 1 below and in FIGS. 1-3.

TABLE 1

|  | $7^{th}$ cycle | | | $100^{th}$ cycle | | | |
|---|---|---|---|---|---|---|---|
|  | Charge capacity (mAh/g) | Discharge capacity (mAh/g) | Charge/discharge efficiency (%) | Charge capacity (mAh/g) | Discharge capacity (mAh/g) | Charge/discharge efficiency (%) | Capacity retention ratio (%) |
| Example 4 | 342.8 | 337.5 | 98.45 | 233.8 | 232.8 | 99.6 | 70.08 |
| Example 5 | 362.7 | 357.4 | 98.53 | 251.2 | 250.3 | 99.7 | 70.11 |
| Example 6 | 358.0 | 353.6 | 98.78 | 236.2 | 235.7 | 99.8 | 66.6 |
| Comparative Example 2 | 379.8 | 376.4 | 99.11 | 225.2 | 222.8 | 98.9 | 59.2 |

Figure 2:
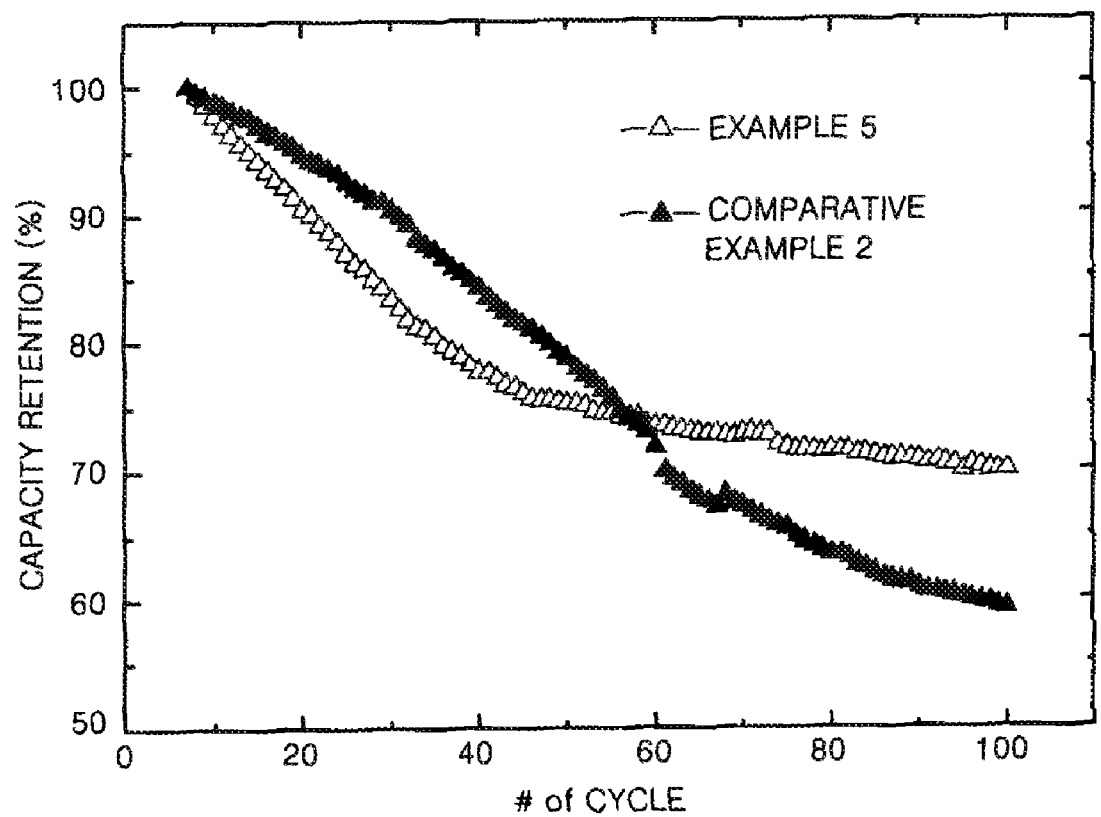
FIG. 2 is a graph of the capacity retention ratios of the lithium ion batteries prepared according to Example 5 and Comparative Example 2.
Figure 3:
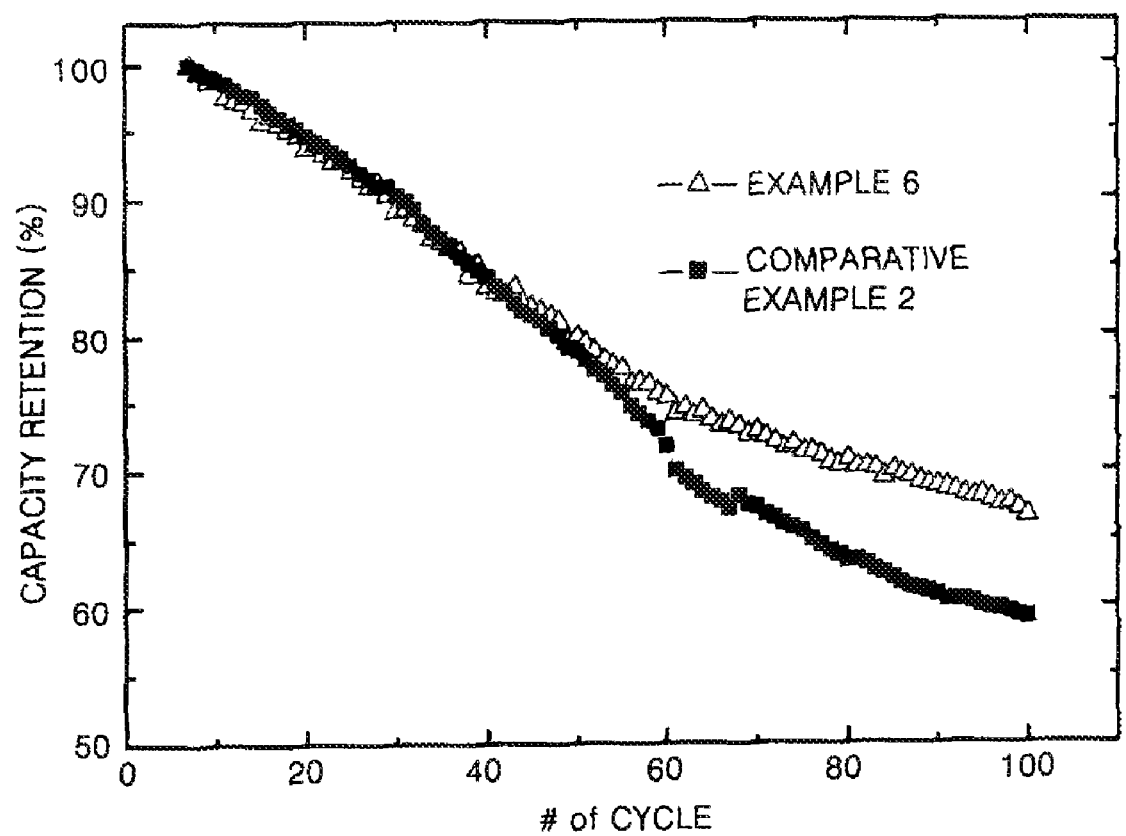
FIG. 3 is a graph of the capacity retention ratios of the lithium ion batteries prepared according to Example 6 and Comparative Example 2.

Referring to FIGS. 1-3, the charge/discharge efficiencies at the $7^{th}$ cycle of the coin cells manufactured according to Examples 4-6 were similar to those of the coin cells manufactured according Comparative Example 2. However, the capacity retention ratios after the $100^{th}$ cycle of the coin cells manufactured according Examples 4-6 were up to 10% greater than those of the coin cells manufactured according to Comparative Example 2 (with no additive). These results show that monomer compounds according to some embodiments of the present invention effectively prevent crack formation and agglomeration of silicon particles caused by volumetric changes in the metal active material during charging/discharging. In addition, monomer compounds according to some embodiments of the present invention induce reversible intercalation/deintercalation of lithium ions, thereby enhancing battery cycle life.

An electrolyte solution according to one embodiment of the present invention uses a monomer compound which can be electrografted and which prevents crack formation caused by volumetric changes in the anode active material during battery charging/discharging. This improves charge/discharge characteristics, which in turn improves the stability, reliability, and charge/discharge efficiency of the battery. In contrast, conventional organic electrolyte solutions have higher irreversible capacities due to decomposition of the polar solvent.

While the present invention has been illustrated and described with reference to certain exemplary embodiments, it is understood by those of ordinary skill in the art that various modifications and changes may be made to the described embodiments without departing from the spirit and scope of the present invention as defined by the following claims.

What is claimed is:

1. An organic electrolyte solution comprising:
   a lithium salt;
   an organic solvent comprising a high dielectric constant solvent and a low boiling point solvent; and
   a monomer compound represented by Formulae 6-9:

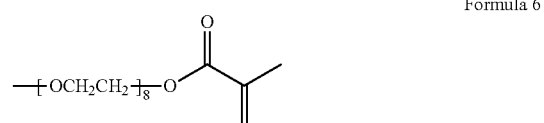

Formula 6

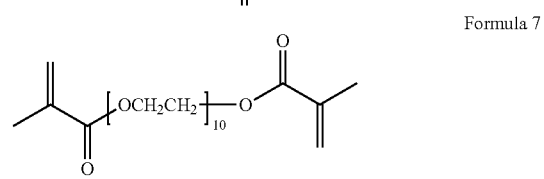

Formula 7

-continued

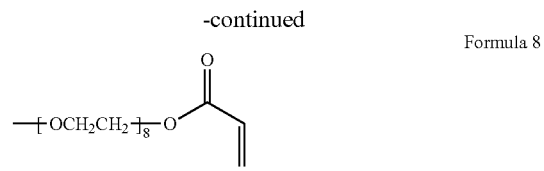

Formula 8

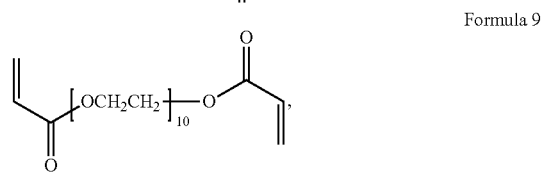

Formula 9 wherein the monomer compound is present in an amount ranging from about 0.5 to about 20 wt % based on the total weight of the organic solvent.

2. The organic electrolyte solution of claim 1, wherein the monomer compound is present in an amount ranging from about 1 to about 15 wt % based on the total weight of the organic solvent.

3. The organic electrolyte solution of claim 1, wherein a concentration of the lithium salt ranges from about 0.5 to about 2.0 M.

4. The organic electrolyte solution of claim 1, wherein the high dielectric constant solvent is selected from the group consisting of ethylene carbonate, propylene carbonate, butylene carbonate, gamma butyrolactone and combinations thereof.

5. The organic electrolyte solution of claim 1, wherein the low boiling point solvent is selected from the group consisting of dimethyl carbonate, ethylmethyl carbonate, diethyl carbonate, dipropyl carbonate, dimethoxyethane, diethoxyethane, fatty acid ester derivatives and combinations thereof.

6. The organic electrolyte solution of claim 1, wherein the lithium salt comprises $LiPF_6$, the high dielectric constant solvent comprises ethylene carbonate, the low boiling point solvent comprises diethyl carbonate, and the monomer compound is selected from the group consisting of poly(ethyleneglycol)methyl ether methacrylate and poly(ethyleneglycol)dimethacrylate.

7. A lithium battery comprising:
a cathode;
an anode; and
the organic electrolyte solution of claim 1.

8. The lithium battery of claim 7, wherein the monomer compound is present in an amount ranging from about 1 to about 15 wt % based on the total weight of the organic solvent.

* * * * *